United States Patent [19]

Koenig et al.

[11] Patent Number: 4,485,620
[45] Date of Patent: Dec. 4, 1984

[54] COOLABLE STATOR ASSEMBLY FOR A GAS TURBINE ENGINE

[75] Inventors: Robert J. Koenig; Leonard W. Stevens, both of Vernon, Conn.

[73] Assignee: United Technologies Corporation, Hartford, Conn.

[21] Appl. No.: 354,470

[22] Filed: Mar. 3, 1982

[51] Int. Cl.³ .............................................. F02C 3/00
[52] U.S. Cl. .................................. 60/39.75; 415/116; 415/136
[58] Field of Search ........................... 60/39.75, 39.83; 415/116, 117, 178, 134, 135, 136, 12

[56] References Cited

U.S. PATENT DOCUMENTS

| | | | |
|---|---|---|---|
| 3,146,992 | 9/1964 | Farrell | 415/12 |
| 3,742,705 | 7/1973 | Sifford | 415/117 |
| 3,966,354 | 6/1976 | Patterson | 415/116 |
| 3,986,720 | 10/1976 | Knudsen et al. | 415/136 |
| 4,005,946 | 2/1977 | Brown et al. | 415/136 |
| 4,019,320 | 4/1977 | Redinger, Jr. et al. | 415/116 |
| 4,050,843 | 9/1977 | Needham et al. | 415/116 |
| 4,247,248 | 1/1981 | Chaplin et al. | 415/136 |

*Primary Examiner*—Louis J. Casaregola
*Assistant Examiner*—Donald E. Stout
*Attorney, Agent, or Firm*—Gene D. Fleischhauer

[57] ABSTRACT

A coolable stator assembly 18 positioned outwardly of an array of rotor blades 32 in a gas turbine engine is disclosed. The stator assembly includes an outer case 48 and an outer air seal 76 positioned outwardly of the array of rotor blades by the outer casing leaving a variable clearance gap G therebetween. The outer case has an upstream flange 52 and a downstream flange 54 for joining the outer case to adjacent cases 46, 50. A coolable rail assembly 22 for varying the diameter of the outer air seal and the clearance gap G is attached to the outer air seal. Various construction details for improving the sealing effectiveness of the stator assembly are developed. The coolable rail assembly is supported inwardly of a plurality of spray bars 26 from the upstream flange and the downstream flange. In one embodiment, a first section 102 and a second section 104 of the outer casing support the rail assembly from the flanges. The cross-sectional area of the first and second sections are smaller than the cross-sectional area of the rail assembly. An array of stator vanes 61 adjacent the outer air seal and rail assembly is supported from a flanged joint 58 spaced axially from the rail assembly.

14 Claims, 3 Drawing Figures

COOLABLE STATOR ASSEMBLY FOR A GAS TURBINE ENGINE

TECHNICAL FIELD

This invention relates to gas turbine engines and more particularly, to a coolable stator assembly disposed outwardly of an array of rotor blades.

BACKGROUND ART

A gas turbine engine of the turbofan type has a fan section, a crxnpression section, a combustion section and a turbine section. An annular flow path for working medium gases extends axially through these sections. As the working medium gases are flowed along the flow path, the gases are pressurized in the fan and the compression sections and burned with fuel in the combustion section to add energy to the gases. The hot, high pressure gases are expanded through the turbine section to produce useful work for pressurizing the gases in the fan and compression sections and thrust for propelling the gas turbine engine.

The turbine section of the engine includes an outer casing which circumscribes the working medium flow path. Arrays of stator vanes extend inwardly from the outer casing across the working medium flow path for directing the working medium gases. Arrays of rotor blades attached to a rotor assembly extend outwardly across the working medium flow path for extracting work from the working medium gases as the gases are flowed along the working medium flow path. An outer air seal at each array of rotor blades is supported and positioned from the outer casing. The outer air seal circumscribes the tips of rotor blades and is closely spaced to the rotor blades to confine the working medium gases to the working medium flow path as the gases pass through the array of rotor blades.

Ideally, there would be no clearance gap between the rotor blades and the outer air seal. However, the tips of the rotor blades move outwardly toward the outer air seal in response to heating by the working medium gases and rotational forces as the blades are driven about their axis of rotation by the hot, high pressure working medium gases. The outer casing which positions the outer air seal about the array of rotor blades is not subjected to rotational forces and is more remote from the working medium flow path than the rotor blades which are bathed in the hot gases. As a result, relative differences in growth occur between the rotor blades and the outer case. A clearance gap must be provided between the outer air seal positioned by the case to avoid a destructive interference between the blades and the seal during transient operating conditions. The clearance gap is desirably large enough to accommodate the maximum differences in thermal growth between the rotor assembly and the outer air seal and is small enough to minimize the adverse impact of working medium gases leaking between the tips of the rotor blades and the outer air seal In modern engines, the outer case which positions the outer air seal is coolable to vary the diameter of the case and thus the radial gap between the array of rotor blades and the outer air seal. Examples of such constructions are shown in U.S. Pat. No. 4,019,320 issued to Redinger et al. entitled EXTERNAL GAS TURBINE ENGINE COOLING FOR CLEARANCE CONTROL and U.S. Pat. No. 4,247,248 issued to Chaplin et al. entitled OUTER AIRSEAL SUPPORT STRUCTURE FOR GAS TURBINE ENGINES. In these constructions, coolable rails extend circumferentially about the exterior of the outer casing.

Pressurized cooling air for this purpose is ducted rearwardly from the compression section or the fan section of the engine to a plurality of spray bars. The pressurized cooling air is impinged through the spray bars on the outer casing of the engine to change the temperature of the casing. The diameter of the case decreases forcing the case and the outer air seal positioned by the case to a smaller diameter. The tip clearance between the array of rotor blades and the outer air seal decreases and an increase turbine efficiency results.

Although an increase in turbine efficiency results in increased engine performance, the increase in performance is diminished by the use of cooling air. The gas turbine engine uses energy to pressurize the cooling air; energy that might otherwise be used for propulsion. Any reduction in the amount of cooling air needed to position the case reduces the performance penalty caused by the work of pressurization. In addition, it is desirable to increase the response time of the outer air seal to cooling of the case to enable the turbine to quickly reach the desired level of turbine efficiency.

Accordingly, scientists and engineers are working to design a coolable stator assembly for use in externally cooled turbine sections that improves the performance of the engine by decreasing the amount of cooling air required to achieve a given clearance and by decreasing the response time of the stator assembly to cooling to decrease the response time needed to achieve a given clearance between the blade tips and the outer air seal.

DISCLOSURE OF INVENTION

According to the present invention, a stator assembly for a gas turbine engine which circumscribes an array of rotor blades and supports an array of outer air seals outwardly of the blade tips includes a case having first and second flanges and a coolable rail assembly for positioning the outer air seal which is supported from the first flange and the second flange to enable the rail assembly to move radially with respect to the first and second flanges in response to changes in temperature of the rail assembly.

In accordance with one embodiment of the present invention, the stator assembly includes an array of stator vanes adjacent the array of outer air seals and an annular member for supporting the array of stator vanes which is free to move radially with respect to the coolable rail assembly.

In accordance with another embodiment, an upstream and downstream section of the flanged case are each joined to the rail assembly and have a minimum cross-sectional area which is less than or equal to one-half the minimum cross-sectional area of the rail assembly.

A primary feature of the present invention is a stator assembly which circumscribes an array of rotor blades. The stator assembly has an outer case having a coolable rail assembly. An outer air seal is attached to the coolable rail assembly and is spaced radially outwardly from the rotor blades. Another feature is the spaced flanges for joining the outer case to a coolable rail assembly for positioning the outer air seal. The case has a first flange and a second flange. In one embodiment, a first section of the case is joined to the rail assembly and extends between the rail assembly and the first flange. A second section is joined to the rail assembly and extends between the rail assembly and the second flange. In another embodiment, the first section is integrally joined to the first flange and the second section and integrally joined to the second flange. In another embodiment, a primary feature is an array of stator vanes adjacent the outer air seal. An annular member extends axially to support the array of stator vanes. The annular member is joined to the outer case at a flange joint between adjacent cases. In one embodiment the rail assembly includes a first rail and a second rail which extend circumferentially about the case and are joined to form a U-shaped channel by an annular element extending between the rails.

A principal advantage of the present invention is the engine efficiency which results from the amount of cooling air required to control the diameter of the rail assembly and the response of the rail assembly to the cooling air which results from supporting the rail assembly from the flanges. In one embodiment, an advantage is the amount of cooling air required for the rail assembly and the response time of the rail assembly which results from enabling the rail assembly to move independently of an adjacent array of stator vanes. Another advantage is the concentricity of the outer air seal with respect to the rotor blade which results from the axial portion of the rail assembly which urges the rails of the rail assembly to move concentrically with respect to the axis of rotation.

The foregoing features and advantages of the present invention will become more apparent in the light of the following detailed description of the best mode for carrying out the invention and in the accompanying drawing.

BEST MODE FOR CARRYING OUT THE INVENTION

Figure 1:
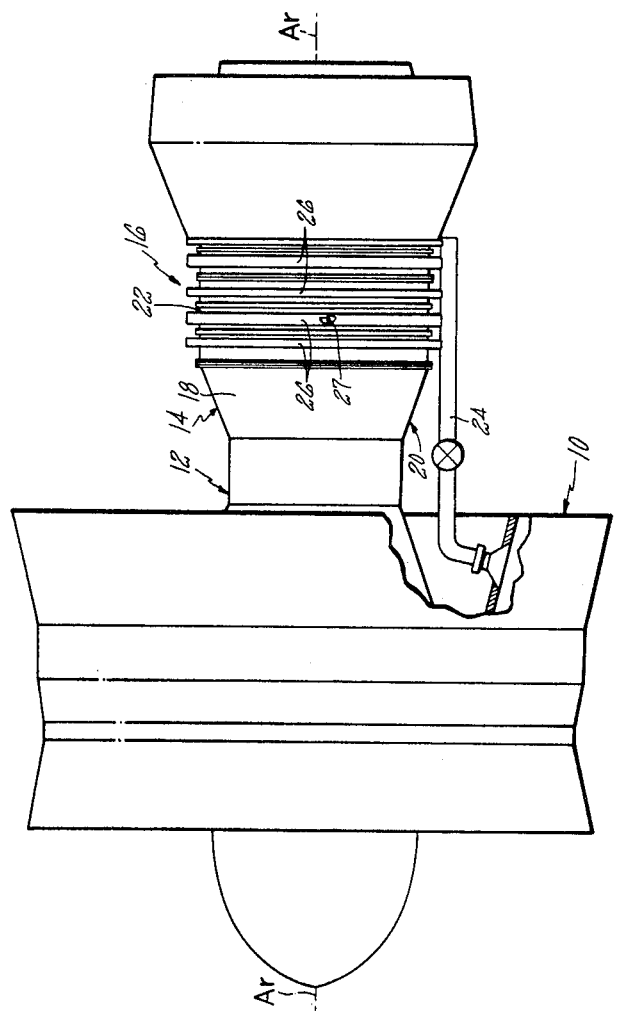
FIG. 1 is a side elevation view of a turbofan gas turbine engine.

A turbofan, gas turbine engine embodiment of the invention is illustrated in FIG. 1. The engine has an axis of rotation Ar. Principal sections of the engine include a fan section 10, a compression section 12, a combustion section 14 and a turbine section 16. A stator assembly 18 extends axially through the engine. The stator assembly includes an outer casing 20. A rail assembly 22 extends outwardly from the casing and circumferentially about the casing. A duct 24 for cooling air extends rearwardly from the fan section of the engine. A plurality of spray bars 26 in flow communication with the duct 24 extend circumferentially about the casing and are spaced from the rail assemblies. Each spray bar has a plurality of holes 27 for directing cooling air toward an adjacent rail assembly.

Figure 2:
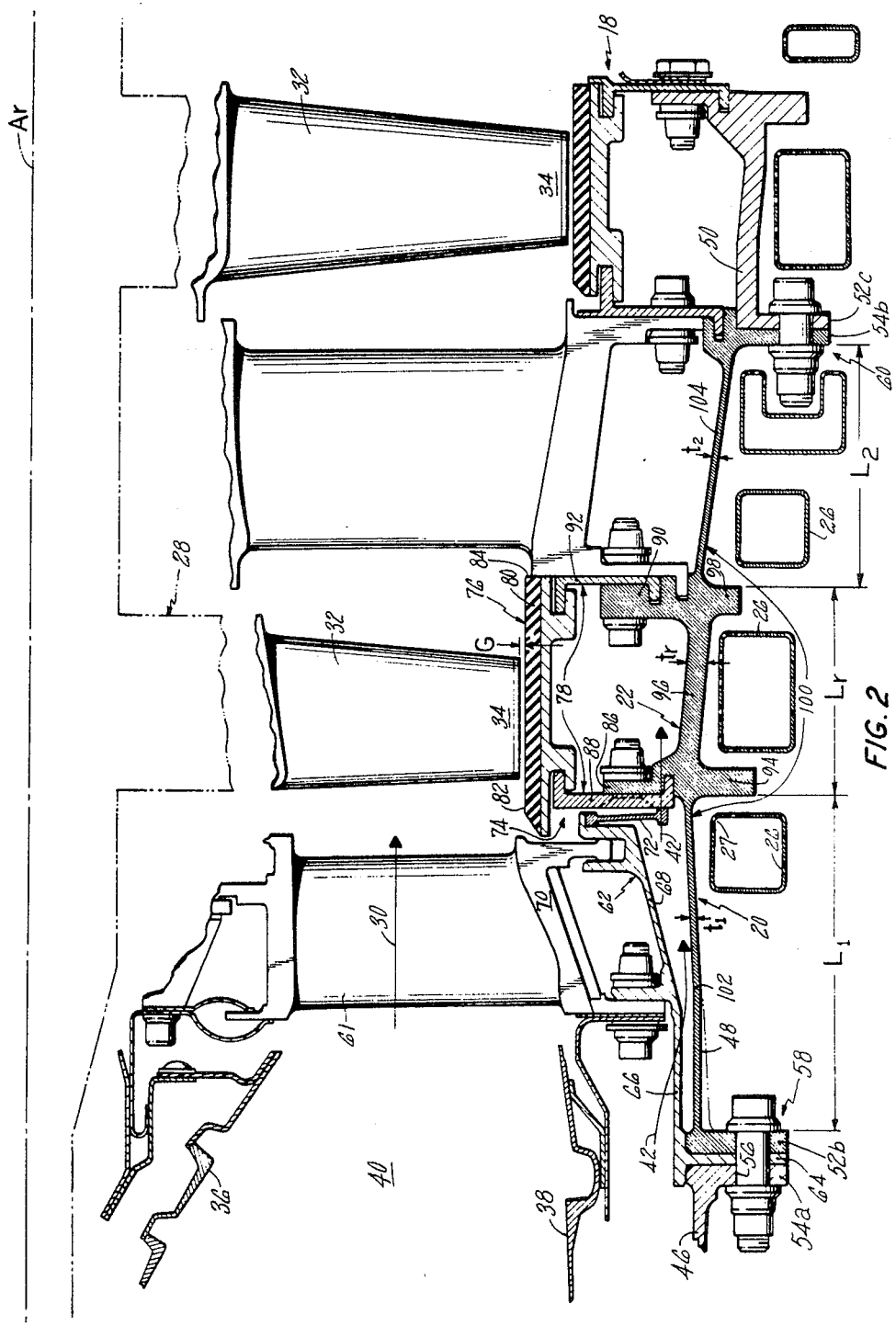
FIG. 2 is a cross-sectional view of a portion of the combustion section and the turbine section of the engine shown in FIG. 1.

FIG. 2 is a cross-sectional view of a portion of the combustion section 14 and the turbine section 16 of the engine. A rotor assembly 28 and an annular flow path 30 for working medium gases extend axially through the engine. The rotor assembly includes arrays of rotor blades as represented by the single rotor blades 32. Each rotor blade has a tip 34. Each array of rotor blades extends outwardly across the working medium flow path into proximity with the outer casing 20 of the stator assembly 18. The combustion section includes an inner liner 36 and an outer liner 38 located upstream of the rotor assembly. A portion of each liner is shown. The inner and outer liners extend circumferentially about the axis Ar and are spaced radially one from the other leaving an annular combustion chamber 40 therebetween. The outer liner is spaced radially from the outer casing 20 leaving an annular passage 42 for cooling air therebetween.

The outer casing 20 includes three axially extending outer cases: a first case, such as the diffuser case 46; a second case, such as the high pressure turbine case 48; and a third case such as the low pressure turbine case 50. Each case has an upstream flange 52 and a downstream flange 54. Each flange has a plurality of holes as represented by the single hole 56. Adjacent flanges and a nut and bolt at each hole form a first flanged joint, such as the upstream flanged joint 58, between the first (diffuser) case and the second (high pressure turbine) case. A second flanged joint, such as the downstream flanged joint 60, joins the second (high pressure turbine) case and the third (low pressure turbine) case.

An array of stator vanes, as represented by the single first stage stator vane, 61 is radially inwardly of the high pressure turbine case 48 and extends inwardly across the working medium flow path 30. A means is provided for supporting the array of stator vanes from the high pressure turbine case. The means is an annular element 62 which extends axially and radially inwardly from the outer casing to support the vanes in cantilevered fashion from the turbine case. The annular element has an annular flange 64, a cylindrical portion 66 and a fustoconical portion 68. The frustoconical portion extends circumferentially about the engine axis Ar and is adapted to receive the outwardly extending portion 70 of each stator vane. The cylindrical portion of the annular element is integrally attached to the frustoconical portion and to the annular flange. The annular flange adapts the annular member to engage the diffuser case 46 and high pressure turbine case at the first flanged joint 58. An annular spring 72 extends between the annular member and the adjacent elements 74 extending inwardly from the outer case. The annular spring slidably engages the adjacent elements leaving the adjacent elements 74 free to move radially with respect to the annular spring and the annular vane support element.

The adjacent elements 74 include an outer air seal 76, the rail assembly 22 of the outer casing 20, and a means 78 for attaching the outer air seal to the rail assembly. The outer air seal is formed of a plurality of circumferentially extending segments as represented by the single segment 80. Each segment has an upstream end 82 and a downstream end 84 and is spaced radially by a gap from the array of rotor blades as represented by the gap G. The means 78 for attaching the outer air seal to the rail assembly includes an upstream flange 86, a segmented upstream support means 88 joined to the upstream flange, a downstream flange 90 and a segmented downstream support means 92 joined to the downstream flange. The rail assembly 22 includes a first rail 94, an annular element 96, and a second rail 98 spaced axially from the first rail. The first rail, and the second rail are integrally attached to the annular element. The rail assembly has an axial length $L_r$.

A means 100 for supporting the rail assembly from the first flange 52$b$ and the second flange 54$b$ enables the rail assembly to move radially with respect to the first and second flanges in response to changes in temperature of the rail assembly. The means 100 includes a first means for supporting the rail assembly, such as the first section 102 of the outer casing, and a second means for supporting the rail assembly such as the second section 104 of the outer casing. The first section extends between the rail assembly 22 and the first flange 52. The first section is integrally joined to the first flange and to the first rail 94. As will be realized the first flange might be tapered into the first section as shown by the dotted line. The first section has an axial length $L_1$ which is equal to or greater than one-half of the axial length $L_r$ of the rail assembly. The first section has minimum cross-sectional area which is smaller than the minimum cross-sectional area of the rail assembly. The second section 104 extends between the rail assembly and the second flange. The second section is integrally joined to the second flange 54b and to the second rail 98. The second section has an axial length $L_2$ which is equal to or greater than one-half of the axial length $L_r$ of the rail assembly and a minimum cross-sectional area which is smaller than the minimum cross-sectional area of the rail assembly. In the embodiment shown, the first section has a thickness $t_1$, the second section has a thickness $t_2$ and the rail assembly has a minumum thickness $t_r$. The thickness and cross-sectional area of the first section and the thickness and cross-sectional area of the second section are less than or equal to one-half of the thickness and cross-sectional area of the rail assembly ($t_1, t_2 \leq [t_r/2]$; $A_1, A_2 \leq [A_r/2]$).

Figure 3:
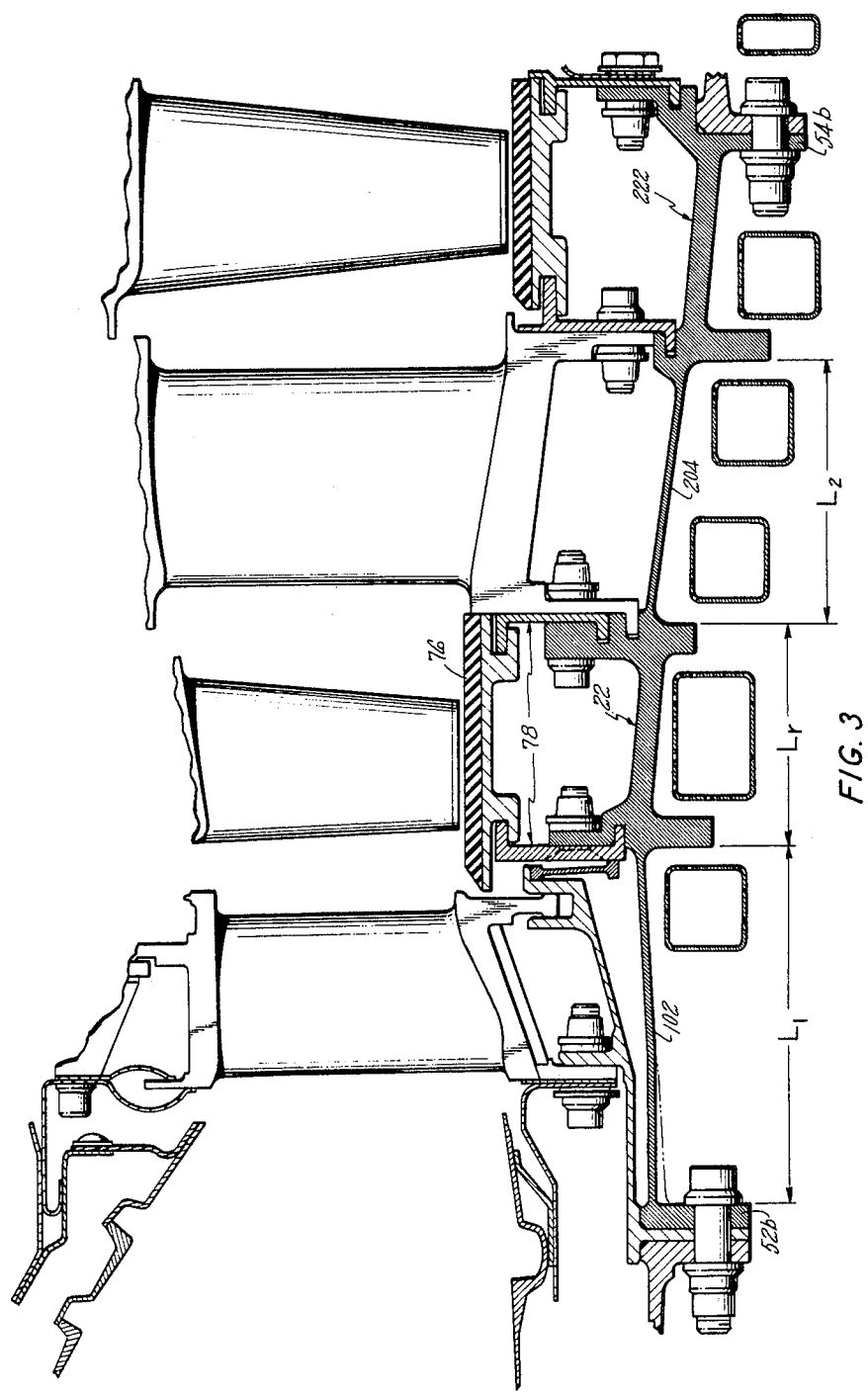
FIG. 3 is an alternate embodiment of the combustion section and turbine section shown in FIG. 2.

FIG. 3 is an alternate embodiment of the outer case 20 having a first coolable rail assembly 22 as shown in FIG. 2. The alternate embodiment of the outer casing has a second coolable rail assembly 222 integrally joined to the second flange. The second section 204 is integrally joined to the second coolable rail assembly and to the first coolable rail assembly 22. As shown in FIG. 2 and in FIG. 3, the first section 102 and the second section 204 have an axial length that is greater than or equal to one-half of the axial length of the first coolable rail assembly and have a cross-sectional area which is smaller than a cross sectional area of both the first coolable rail assembly and the second coolable rail assembly.

During operation of the gas turbine engine, fuel is mixed with working gases in the annular combustion chamber 40 of the combustion section 14. The fuel is burned in the chamber to add energy to the working medium gases in the form of heat. The high temperature, high pressure working medium gases are discharged from the combustion section and expanded through turbine section 16 to do work on the rotor blades 32. As the working medium gases are passed along the annular flow path 30 through the turbine section, the arrays of stator vanes 61 and the arrays of rotor blades are bathed in the working medium gases. Heat is transferred from the hot gases to the vanes and blades. As the rotor blades are rotated about the axis of rotation $A_r$ and are heated by the working medium gases the rotor blades move rapidly outwardly toward the circumscribing array of outer air seal segments. The rail assembly 22 of the outer casing 20, which supports and positions the outer air seal, is not in close proximity to the working medium flow path and is isolated from the hot working medium gases by cooling air flowed along the cooling passage. The rail assembly responds more slowly than does the rotor blades to changes in temperature and not at all to rotational forces.

During a transient operation, such as a sudden increase in power at a sea level take off (SLTO) of the aircraft, the gap G decreases as the tip of the rotor blade moves rapidly outward toward the outer air seal. The gap G between the outer air seal and the rotor blades is large enough to accommodate the difference in transient growth between which causes movement outwardly of the motor blade with respect to the outer air seal. As the engine reaches a steady state operating condition, such as cruise, the temperature of the rail assembly 22 rises causing the rails to expand opening the gap G between the outer air seal and the tips of the rotor blade. Cooling air is flowed through the duct 24, discharged from the spray bars 26 and impinged on the rail assembly 22. This cooling causes the rail assembly to contract moving the outer air seal inwardly with respect to the rotor blades, decreasing the gap G and the amount of working medium gases flowing between the tips of the rotor blades and the outer airseals.

As discussed earlier, the increase in efficiency which results from decreasing the leakage between the tips 34 of the rotor blades 32 and the outer air seal 76 is offset to some extent by the work required to pressurize the cooling air for cooling the rail assembly 22. The amount of cooling air required to cool the rail assembly and the amount of time required to cool the rail assembly for a given flow of cooling air (response time) is proportional to the amount of heat which is conducted into the rail assembly from the flow path during cooling by the cooling air and to the mass and specific heat (thermal capacitance) of the rail assembly.

The mass of the rail assembly is selected to exert a sufficient compressive force to overcome the resistance of the flanges, the segmented supports, the adjacent portions of the case and the segmented outer airseals and to move the outer air seals toward the rotor blades without exceeding the allowable stress in the rail assembly. Avoiding a bolted connection at the rail assembly avoids the stress concentrations resulting from the presence of holes extending through the flanges and the mass associated with the bolts. The mass of the rail assembly is reduced as compared with constructions having a bolted connection at the rail assembly. The decreased mass decreases the amount of cooling air required to move the rail assembly inwardly and decreases the response time for closing the gap G.

The cross-sectional area and length of the first section 102 and the second section 104 of high pressure turbine case 48 minimizes the ability of these sections of the case to resist the compressive force exerted by the rail assembly 22 as the rail assembly contracts. Because the mass of the rail assembly is proportional to the forces the rail assembly must exert, minimizing the ability of these sections to resist movement of the rails minimizes the mass of the rails and reduces the amount of cooling air required and the response time for closing the gap.

The annular element 62 for supporting the circumferentially segmented array of stator vanes 61 is axially spaced from the adjacent elements 74 and the circumferential surface of attachment at the annular flange 64 of the annular element to the outer casing is axially spaced from the rail assembly separating the annular element from the rail assembly. This separation avoids the need for the rail assembly 22 to exert a force on the annular element for supporting the stator vanes as the rail assembly moves the array of outer air seal inwardly.

In addition, the stator vanes are heated by the working medium gases. Heat is transferred from the stator vanes to the annular element 62. The separation of the annular element from the adjacent elements and particularly the rail assembly blocks the transfer of heat from the stator vanes to the rail assembly. Because the amount of heat is reduced as compared with constructions in which the array of first stage stator vanes is attached at the upstream flange, less cooling air is required to cool the rail assembly. Accordingly, engine efficiency is not only increased by reducing the amount of cooling air required to cause the rails to exert the level of force required to overcome the force resisting the positioning of the outer air seals, but also by increasing the response time of the rail assembly by decreasing the amount of heat which must be removed from the rail assembly to achieve a given level of temperature in the rail assembly.

The concentricity of the outer air seal 76 with respect to the tips 34 of the array of rotor blades 32 and to the axis of rotation $A_r$ is maintained by the first and second sections 102, 104 which position the rail assembly 22 axially and radially with respect to axis of rotation while permitting relative radial growth with respect to the flanged joints 58, 60. The rigidity of the rail assembly which results from the U-shaped channel configuration of the rail assembly in comparison to the flexibility of the first and second sections enables the two rails to act in concert and decreases any tendency towards out of roundness caused by local variations in the heating of adjacent portions of the outer casing.

The alternate embodiment shown in FIG. 3 has the same features and advantages as the embodiment shown in FIG. 2. In the alternate embodiment, the second section 204 cooperates with thr first section to support and position the rail assembly by transmitting forces to the flanged joint 60 through the second rail assembly 222.

Although the invention has been shown and described with respect to detailed embodiments thereof, it should be understood by those skilled in the art that various changes in form and detail thereof may be made without departing from the spirit and the scope of the claimed invention.

We claim:

1. In a gas turbine engine of the type having a stator assembly which includes an outer case, an outer air seal circumscribing the tips of an array of rotor blades, and a means for attaching the outer air seal to the outer case, the outer case having a coolable rail assembly outwardly of the air seal extending circumferentially thereabout and first and second flanges for attaching the outer case to adjacent cases, the improvement which comprises:

an outer casing having
a first section integrally joined to the rail assembly which extends between the rail assembly and the first flange, the first section having a minimum cross-sectional area which is smaller than the minimum cross-sectional areal of the rail assembly;
a second section integrally joined to the rail assembly which extends between the rail assembly and the second flange, the second section having a minimum cross-sectional area which is smaller than the minimum cross-sectional area of the rail assembly;

wherein the first and second sections support and position the rail assembly in the axial and radial direction from the first and second flanges and flexibly deform in the radial direction to enable thermal changes in the diameter of the rail assembly with respect to the upstream and downstream flanges.

2. The stator assembly as claimed in claim 1 wherein the rail assembly includes a first rail, a second rail axially spaced from the first rail and an annular element extending in a generally axial direction between the first rail and the second rail.

3. The stator assembly as claimed in claim 2 wherein the first rail has a greater cross-sectional area than the second rail.

4. The stator assembly as claimed in claim 1 wherein the first section is integrally joined to the first flange.

5. The stator assembly as claimed in claim 4 wherein the second section is integrally joined to the second flange.

6. The stator assembly as claimed in claim 4 which further has a second coolable rail assembly integrally joined to the second flange wherein the second section is integrally joined to the second coolable rail assembly and wherein the first section and the second section have a minimum cross-sectional area which is smaller than the minimum cross-sectional area of the second coolable rail assembly.

7. In a gas turbine engine of the type having a stator assembly which includes an outer air seal circumscribing the tips of an array of rotor blades, an array of stator vanes adjacent the outer air seal and the rotor blades and an outer casing formed of three axially extending outer cases, the first case being joined to the second case at a flanged joint and the second case being joined to the third case at a second flanged joint, the second case having a first flange, a second flange and a coolable rail assembly outwardly of the outer air seal extending circumferentially thereabout and attached to the outer air seal to position the outer air seal, wherein the improvement comprises:

means for supporting the rail assembly from the first flange and the second flange which enables the rail assembly to move radially with respect to the first and second flanges in response to changes in temperature of the rail assembly; and
means for supporting the array of stator vanes adjacent the rail assembly from the outer casing which is free to move radially with respect to the coolable rail assembly.

8. In a gas turbine engine of the type having a stator assembly which includes an outer air seal circumscribing the tips of an array of rotor blades, an array of stator vanes adjacent the outer air seal and the rotor blades and an outer casing formed of three axially extending outer cases, the first case being joined to the second case at a flanged joint and the second case being joined to the third case at a second flanged joint, the second case having a first flange, a second flange and a coolable rail assembly outwardly of the outer air seal extending circumferentially thereabout and attached to the outer air seal to position the outer air seal, the improvement which comprises:

an outer case having a first means for supporting the rail assembly which extends between the rail assembly and the first flange, a second means for supporting the rail assembly which extends between the rail assembly and the second flange; and means for supporting the array of stator vanes which extends axially and radially inwardly from the outer casing to support the vanes in cantilevered fashion from the outer casing and which is free to move radially with respect to the outer air seal and coolable rail assembly;

wherein the first means and second means for supporting the rail assembly positions and supports the rail assembly in the axial direction and flexibly supports the rail assembly in the radial direction enabling the rail assembly to move radially with respect to the means for supporting the array of stator vanes and with respect to the first and second flanges.

9. In a gas turbine engine of the type having a stator assembly which includes an outer air seal circumscribing the tips of an array of rotor blades, an array of stator vanes adjacent the outer air seal and the rotor blades, and an outer casing formed of three axially extending outer cases, the first case being joined to the second case at a first flange joint and the second case being joined to the third case at a second flanged joint, the second case having a first flange, a second flange and a coolable rail assembly outwardly of the outer air seal extending circumferentially thereabout and attached to the outer air seal to position the outer air seal, the improvement which comprises:

an outer case having a first section integrally joined to the rail assembly and the first flange, the first section having a minimum cross-sectional area which is smaller than the minimum cross-sectional of the rail assembly, and a second section integrally joined to the rail assembly which extends between the rail assembly and the second flange, the second section having a minimum cross-sectional area which is smaller than the minimum cross-sectional area of the rail assembly; and means for supporting the array of stator vanes which extends axially and radially inwardly from the outer casing to support the vanes in cantilevered fashion from the outer casing and which is free to move radially with respect to the outer air seal and coolable rail assembly, wherein the first and second section support and position the rail assembly in the axial direction and flexibly support the rail assembly in the radial direction.

10. The stator assembly as claimed in claim 9 wherein the means for supporting the array of stator vanes is joined to the outer casing at the first flange joint.

11. The stator assembly as claimed in claim 10 wherein the array of stator vanes is axially spaced from the outer air seal and the first flanged joint is axially spaced from the array of stator vanes.

12. The stator assembly as claimed in claim 11 which further has a chamber for burning fuel with the working medium gases and the outer casing is spaced radially from the chamber leaving a passage for cooling air therebetween, wherein the first flanged joint is radially outwardly of the combustion chamber and is adjacent the passage for cooling air.

13. The stator assembly as claimed in claims 1, 3, 4, 5, 6, 7, 10, 11 or 12 wherein the length $L_1$ of the first section and the length $L_2$ of the second section are greater than or equal to one-half of the length $L_r$ of the rail assembly ($L_1 \geq [L_r/2]$; $L_2 \geq [L_r/2]$).

14. The stator assembly as claimed in claim 13 wherein the minimum cross-sectional area $A_1$ of the first section and the minimum cross-sectional area $A_2$ of the second section are less than or equal to one-half of the minimum cross-sectional area $A_r$ of the rail assembly ($A_1 \leq [A_r/2]$; $A_2 \leq [A_r/2]$).

* * * * *

UNITED STATES PATENT AND TRADEMARK OFFICE
CERTIFICATE OF CORRECTION

PATENT NO. : 4,485,620

DATED : December 4, 1984

INVENTOR(S) : Robert J. Koenig et al.

It is certified that error appears in the above-identified patent and that said Letters Patent is hereby corrected as shown below:

Column 1, line 12:  after "a" change "crxnpression" to "compression"

Column 3, line 4:   after "section" change "and" to "is"

Column 4, line 34:  after "and a" change "fustoconical" to "frustoconical"

Column 7, line 35:  after "with" change "thr" to "the"

Column 7, line 58:  after "extends" change "betwen" to "between"

Column 7, line 61:  after "cross-sectional" change "areal" to "area"

Signed and Sealed this

Tenth Day of December 1985

[SEAL]

Attest:

DONALD J. QUIGG

*Attesting Officer*       *Commissioner of Patents and Trademarks*